Feb. 9, 1965    J. R. OISHEI ETAL    3,168,758
WINDSHIELD WIPER SYSTEM
Filed Nov. 29, 1963    3 Sheets-Sheet 1

INVENTOR.
JOHN R. OISHEI and
BY  RAYMOND A. DEIBEL

E. Herbert Liss
ATTORNEY.

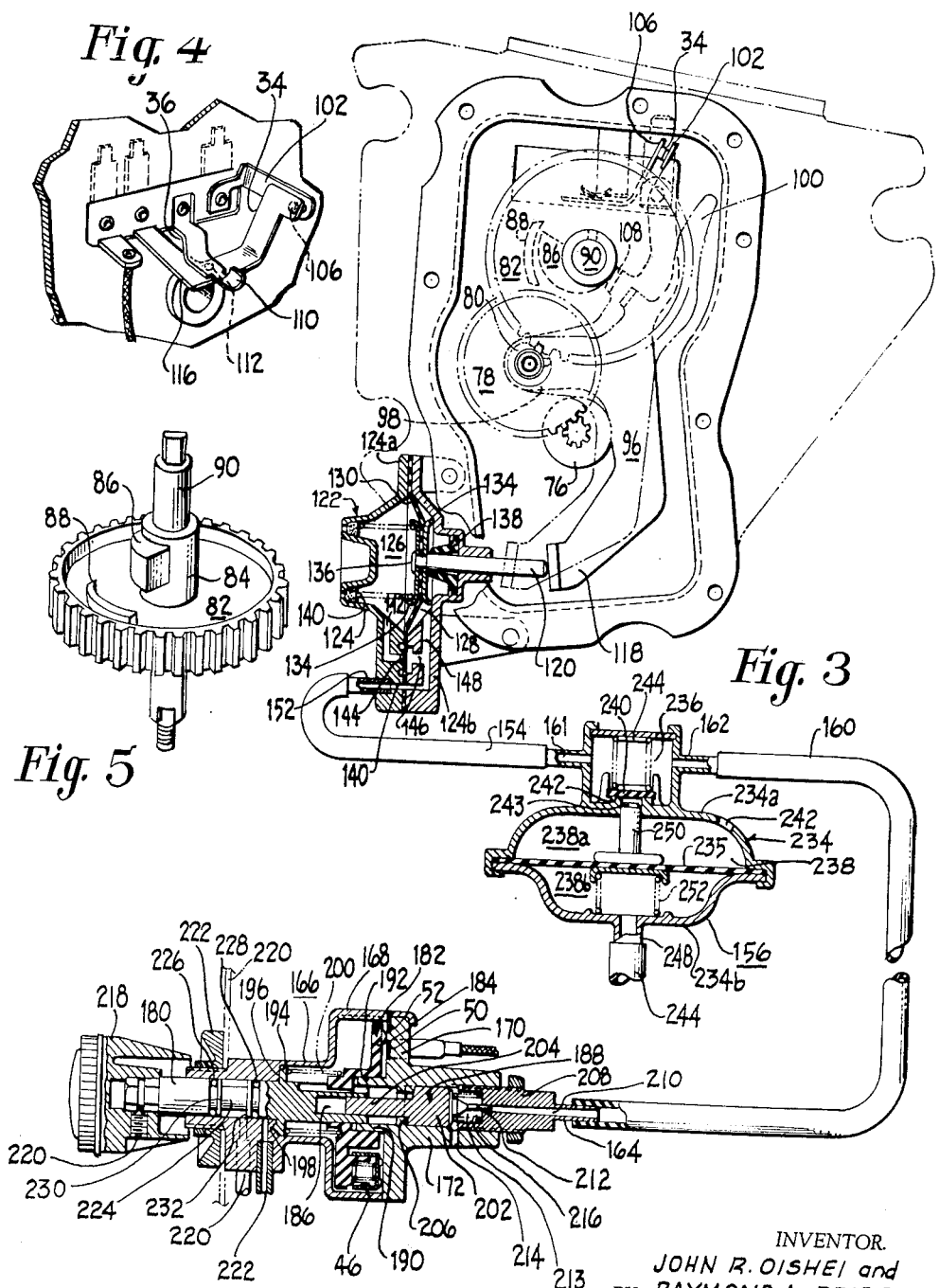

Feb. 9, 1965   J. R. OISHEI ETAL   3,168,758
WINDSHIELD WIPER SYSTEM
Filed Nov. 29, 1963   3 Sheets-Sheet 3

INVENTOR.
JOHN R. OISHEI and
BY RAYMOND A. DEIBEL

E. Herbert Liss
ATTORNEY.

United States Patent Office 3,168,758
Patented Feb. 9, 1965

3,168,758
WINDSHIELD WIPER SYSTEM
John R. Oishei, Buffalo, and Raymond A. Deibel, Cheektowaga, N.Y., assignors to Trico Products Corporation, Buffalo, N.Y.
Filed Nov. 29, 1963, Ser. No. 326,953
10 Claims. (Cl. 15—250.12)

The present invention relates to an intermittent dwell windshield wiper system for producing a dwell period following cyclic wiper operation and more particularly to a windshield wiper of this type wherein a single manually operated control is utilized for initiating continuous wiper operation, intermittent dwell wiper operation and variation of the dwell period for intermittent dwell operation.

In application Serial No. 292,201 by John R. Oishei et al., filed June 27, 1963, now Patent No. 3,117,335, there is disclosed a windshield wiper system similar to the system of the present invention in which a plural functioning manual control is utilized to initiate either continuous or intermittent wiper operation and to provide variation in the dwell period. In that application the manual control comprises a pair of concentric control shafts formed in a unitary structure. The present invention is an improvement over the aforementioned application in that a single manual control shaft is utilized to perform a plurality of functions, namely, serving as a switch for switching from parked to either continuous or intermittent dwell and to vary the dwell period. This improved and simplified control is desirable for both increased safety and greater convenience. The increasing number of control knobs which a vehicle operator must cope with introduces confusion and irritation to the driver. Therefore, elimination of a control knob while retaining its function constitutes substantial improvement. The present invention also is concerned with an embodiment in which, in addition to the improved manual control, continuous operation of the wiper blades will automatically be initiated upon vehicle acceleartion. This is desirable under certain road and weather conditions as, for example, when passing another vehicle where substantial splash-back may occur requiring rapid clearing of the windshield.

It should also be noted that the unique manual control of this invention permits omission of a continuous operation position. When the switch is moved to the beginning of an extended intermittent dwell position, a very short dwell period is provided which is tantamount to continuous operation with a negligible pause at the end of the stroke. With such operation the short rest period between wiper cycling reduces the reversal speed of the wiper which can cause irritating noise upon reversal.

The principal object of the present invention is to provide an improved intermittent dwell windshield wiper system which can be operated either as a continuous windshield wiper system or an intermittent dwell windshield wiper system wherein a single manual control is utilized.

Another object of the invention is to provide an improved windshield wiper which can be operated either continuously or intermittently and wherein the dwell period can be varied manually which utilizes a single manual control.

A further object of the invention is to provide an improved windshield wiper system which can be operated continuously or intermittently and in which the dwell period can be varied during the intermittent operation and in which the wipers can be switched from intermittent operation to continuous operation automatically in response to vehicle acceleration which utilizes a single manual actuator to provide operator control of the diverse functions of the system.

Other objects and advantages of the invention will be apparent from the following detailed description taken in connection with the accompanying drawings in which:

FIG. 3 is a diagrammatic view of a windshield wiper of this invention showing another form of the transmission, the outlet control valve and the manual control in cross section;

FIG. 4 is a perspective view of the internal parking switch and intermittent control switch;

FIG. 5 is a perspective view of the output gear and shaft of the transmission employed in this invention showing the cams for operating the internal switches and the intermittent control lever;

Briefly, the invention comprises a windshield wiper power unit which includes a motor and a gear reduction unit with a cyclic timing device including a pneumatic time delay mechanism for producing intermittent dwell action when activated. The cyclic timing device includes a housing having a diaphragm dividing the housing into a pair of compartments. Secured to the diaphragm is a plunger which extends into the housing of the gear reduction unit and is actuated in one direction by a cam formation on the output gear and is returned in the opposite direction by a spring. In one embodiment, actuation of the plunger operates a switch for interrupting the power supply for the power unit. Reclosing of the switch is effected by return action of the plunger, which return is delayed by a slow bleed on the opposite side of the diaphragm. The bleed rate is controlled by a unique manual control which incorporates a switching contactor for switching from continuous to intermittent dwell position and wherein the intermittent dwell position is of extended sweep. Rotation or actuation of the manual control in the extended intermittent position effects movement of a needle valve for controlling the bleed rate. Inserted in the pneumatic circuit between the manual control and the bleed on the cyclic timing device is a manifold actuated valve which opens in response to lowered manifold pressure which occurs during vehicle acceleration and bleeds the pneumatic circuit of the cyclic timing device to cause rapid spring return of the plunger, thereby effecting continuous operation.

In another form of the invention, the circuit interruptor for the power unit is disposed interiorly of the gear box transmission and is actuated through a lever which is driven to switch closing position by the plunger of the cyclic timing device and in which circuit interruption is accomplished by driving the lever with a cam mounted on the output gear of the transmission to permit the normally open circuit interruptor to move to its open position. In this case, return by the spring causes the plunger to again drive the lever to switch closing position for a repeated cycle of wiper operation.

Figure 1:
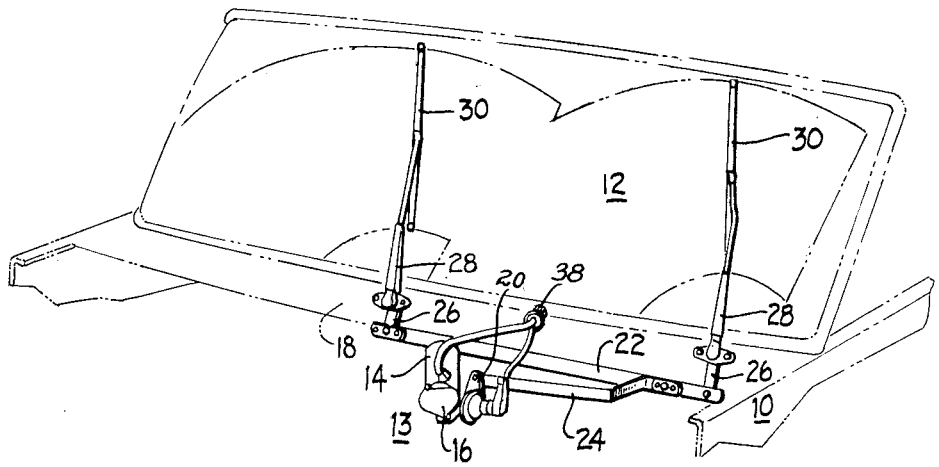
FIG. 1 is a partial perspective view of the motor vehicle embodying the instant invention.

In FIG. 1 an automotive vehicle 10 is shown having a windshield 12 mounted thereon in a conventional manner. A windshield wiper power unit 13 having a motor 14 and a gear reducer unit 16 is mounted on the fire wall 18 of the vehicle. The gear reducer unit 16 has a crankarm 20 operatively coupled to the output shaft. An elongated link 22 is pivotally secured to the crankarm 20 through a second elongated link 24. Opposite ends of the link 22 are connected with the crankarms 26 mounted at the inner ends of the rockshafts or pivot shafts, not visible, which are journaled in the cowl of the vehicle and which have wiper arms 28 mounted at their outer ends. The wiper arms each carry wipers 30. When the wiper power unit 13 is energized, the wipers 30 will be oscillated across the windshield to clear moisture therefrom. The gear reducer unit 16, crankarms 20 and 26, links 22 and 24 and the rockshafts constitute the wiper transmission means and the gear reducer unit 16 constitutes a torque transmitting mechanism.

Figure 7:
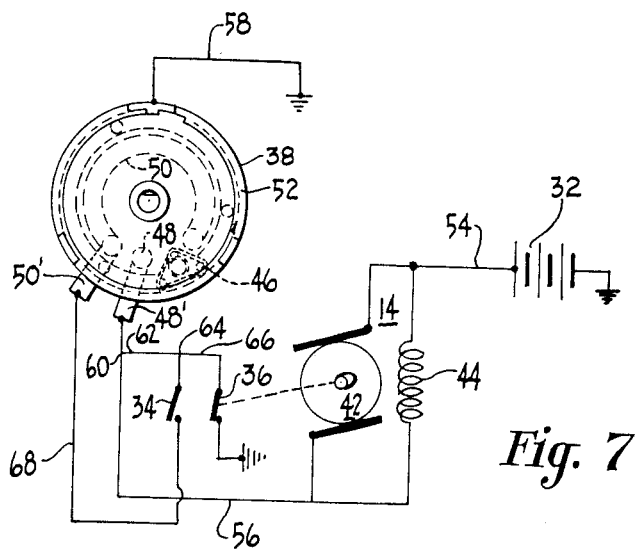
FIG. 7 is a circuit diagram schematically showing the circuitry of the windshield wiper power unit.

The wiper circuit, FIG. 7, includes a battery 32 or other suitable source of power. Included in the circuit are internal intermittent and parking switches 34 and 36, respectively, and manual switch 38. The motor 14 includes an armature 42 and a field winding 44 connected in parallel. The switch 38 includes a movable contactor 46, stationary contacts 48 and 50 and a ground ring 52.

In the wiper off position of manual switch 38, illustrated in FIG. 7, a circuit is completed from battery 32 to ground through lead 54, motor 14, lead 56, junction 60, lead 62, junction 64, lead 66 and internal parking switch 36 to ground. Thus the wiper motor 14 will continue to rotate when the switch 38 is in the wiper off position until such time as the blades reach a parked position, preferably against the lower windshield molding. The switch 36 is operated by a cam on the hub of an output gear and is alternately opened and closed during motor rotation. The switch 36 opens only when the wiper blades are at the end of a stroke in the parking position. At this time a cam driven by the motor actuates the switch 36 to open position and wiper operation ceases.

When the switch 38 is rotated from its wiper off position, shown in FIG. 7, to its continuous run position, movable contactor 46 is moved to a position where it connects contact 48 with ground ring 52. A circuit is then completed from battery 32 through lead 54, motor 14, lead 56, contact terminal 48′, contact 48, ground ring 52 and lead 58 to ground. In the continuous run position, the circuit from the battery 32 through the motor to ground bypasses both the internal parking switch 36 and the internal intermittent switch 34.

When the contactor 46 is moved further clockwise to its intermittent dwell position, it connects extended contact 50 with ground ring 52. It should be particularly noted that contact 50 is an extended contact which extends through an arc of more than one hundred eighty degrees so that considerable rotational movement of the control can occur while the switch remains in the intermittent dwell position. In the intermittent dwell position a circuit is completed from battery 32, lead 54 through motor 14, lead 56 to junction 60, lead 62, junction 64, lead 66 and internal switch 36 to ground. In this position a parallel circuit is completed from junction 64 to ground through internal intermittent switch 34, lead 68, contact terminal contact 50′, contact 50, movable contactor 46, ground ring 52 and lead 58 to ground.

The internal intermittent switch 34 includes a stationary contact 106 and a movable contact 102. The movable contact 102 is normally biased to open circuit condition and may be actuated to closed position or released to open position by a cyclic timing device responsive to a cam on the output gear which is driven by the motor 14. During intermittent dwell operation, the internal intermittent switch 34 is periodically opened, at which time the circuit is completed through parking switch 36 until the wiper blades reach their parked position, at which time motor rotation ceases. The cyclic timing device then operates, after a predetermined operator selected duration of time, to close internal intermittent switch which completes the parallel circuit from the battery 32 through the motor and internal intermittent switch 34 to ground, thereby restarting motor operation until the cyclic timing device again releases contact 104 to effect reopening of switch 34 whereupon another dwell period occurs when the blades reach parked position.

Figure 2:
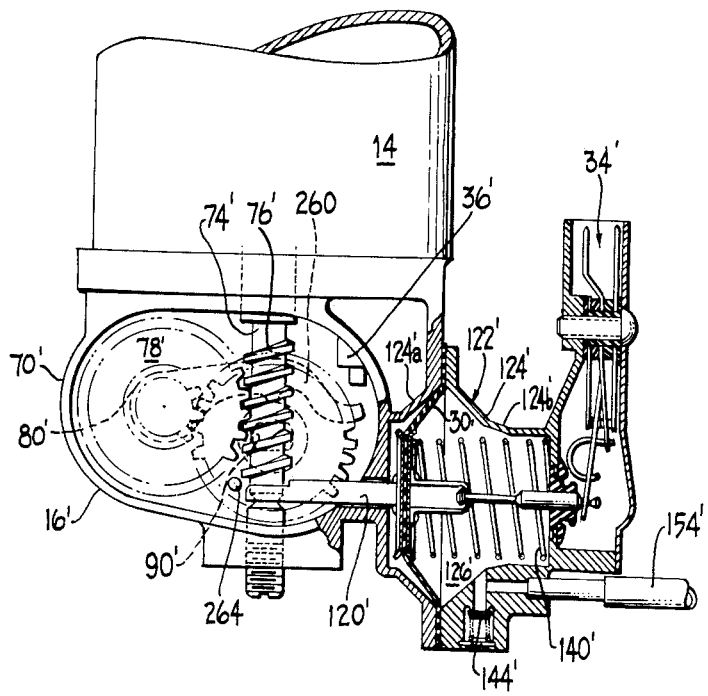
FIG. 2 is a sectional view of a wiper motor transmission embodying the invention.

One form of gear reducer unit 16 which may be utilized in this invention is shown in detail in FIGS. 3, 4, 5 and 6. Another form is shown in FIG. 2. The following description relates to the FIG. 3 embodiment.

The gear reducer unit housing 70 is secured to the end of the motor housing 72 and the output shaft 74 of the motor 14 has mounted thereon a pinion 76 which meshes with an idler gear 78. Mounted concentrically to the idler gear for rotation therewith is a pinion 80 which meshes with the output gear 82 of the gear reducing mechanism. The output gear 82 has a centrally disposed cylindrical hub 84. Mounted on the outer wall of the cylindrical hub 84 is a cam 86 for a purpose to be hereinafter explained. Mounted on the side surface of the output gear 82 is an arcuate cam 88 for actuating the internal parking switch 36. The hollow cylindrical hub 84 receives therein an output shaft 90 which extends exteriorly of the gear box housing 70. The output shaft 90 is journaled for rotation in bearings 92 and 94 on opposite sides of the gear box housing 70. The output gear 82 and output shaft 90 are assembled for rotation together. A bellcrank lever 96 has a centrally disposed laterally extending arm 98 which is secured for rotation on the shaft of idler gear 78. A switch engaging arm 100 of the bellcrank lever 96 is disposed for engagement with a movable contact 102 of the internal intermittent switch 34. Switch 34 also includes a stationary contact 106. As hereinabove noted, movable contact 102 is biased to maintain switch 34 opened and may be actuated to closed position by arm 100 of bellcrank lever 96. A projection 108 is provided intermediate the ends of arm 100 of bellcrank lever 96 and is disposed for engagement with cam 86 on output gear 82. The cam 88 on output gear 82 is disposed for engagement with cam follower 110 on movable contact 112 of internal parking switch 34 which also includes a stationary contact 116. Another arm 118 of bellcrank lever 96 is disposed for engagement with the plunger rod 120 of a cyclic timing device 122.

Figure 6:
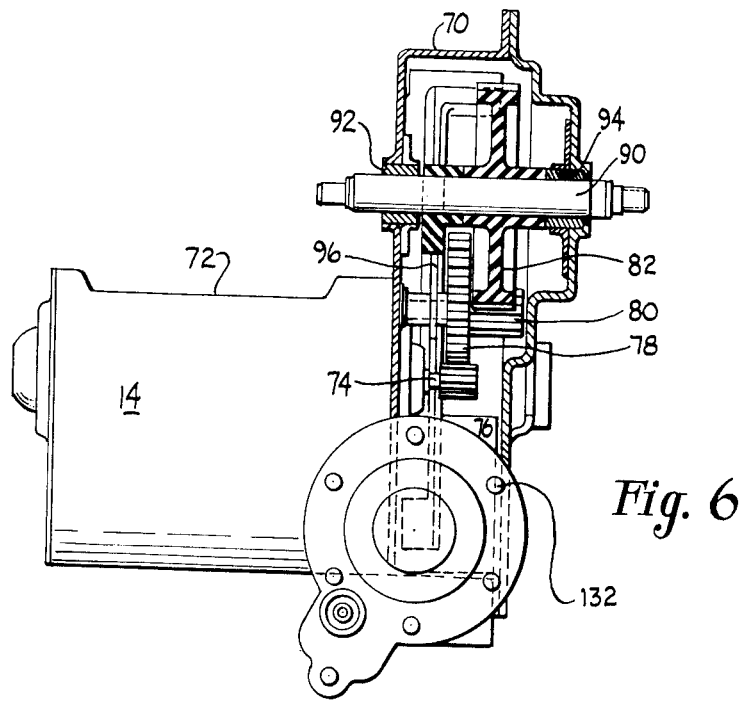
FIG. 6 is a side elevational view of the windshield wiper power unit of this invention showing the transmission in cross section.

Cyclic timing device 122 comprises a housing 124 formed of a first section 124a and a second section 124b. The section 124b includes a bracket for securing the cyclic timing device 122 to the gear box housing 70. The cyclic timing device is divided into a first compartment 126 and a second compartment 128 by a diaphragm 130. The diaphragm 130 has its periphery disposed between the peripheries of the housing halves 124a and 124b. The diaphragm 130 and the housing halves 124a and 124b are secured together about their peripheries in any suitable manner as, for example, by rivets 132 as shown in FIG. 6. A pair of rigid discs 134 are disposed centrally on each side of the diaphragm 130 and may be of metal or other suitable rigid material. A reduced end portion of plunger 120 is received centrally through the discs 134 and the diaphragm 130 and is peened over as at 136 to retain the plunger in assembled relation with the diaphragm 130, the diaphragm 130 and the discs 134 being retained between the shoulder formed by the reduced end portion of the plunger 120 and the peened over portion 136. The plunger 120 extends outwardly of the housing half 124b through the compartment 128 and into the gear box housing 70 in position to be engaged by arm 118 of bellcrank lever 96. Arm 118 has a flange on the end thereof for engagement with the plunger 120. A gland seal 138 is provided for forming an air tight seal between the plunger and the cyclic timing device housing half 124b. A return spring 140 is disposed in chamber 126 and extends from the disc 134 to the end of the housing half 124a. The internal surface of the housing half 124a is shaped to provide a spring retainer for spring 140 and the disc 134 forms a retainer for the other end of spring 140. A conduit 142 in timing device housing half 124a communicates through a check valve 144 with a conduit 146 which in turn communicates with a conduit 148 leading to compartment 128 and a conduit 150 leading outwardly of the cyclic timing device housing 124 through a nipple 152. The nipple 152 is secured to an external conduit 154 leading to a fluid pressure operated valve assembly 156. A conduit 160 leads from the fluid operated valve assembly 156 from a nipple 162 threon to a nipple 164 on a manual control assembly 166.

Manual control assembly 166 (FIG. 3) is an operator actuated, single knob, multi-purpose control which may be used for causing the wiper to: (1) operate intermittently; (2) operate continuously; (3) park the wiper; (4) adjust the duration of the dwell period during intermittent dwell operation; and (5) control an auxiliary accessory, as for example, a windshield washer. Manual control assembly 166 includes a body portion 168 which may be of suitable conducting material. One end of the body portion 166 is of enlarged cylindrical configuration closed at its free end by a member 170 of suitable insulating material. Member 170 includes a hollow central hub portion 172. Disposed for slidable and rotatable movement within the body portion 168 of the manual control 166 is a shaft 180 which has keyed thereto at its free end within the enlarged portion of housing 168 a movable contactor assembly 182 which includes a movable contactor plate 184 of suitable insulating material having mounted thereon movable contactor 46 of suitable conducting material. The contactor assembly 182 is keyed to the shaft 180 for rotation therewith, but is freely slidable longitudinally relative thereto. An axial recess 186 is provided at the inner end of shaft 180 and this recess may be of polygonal configuration in lateral cross section or any other suitable shape to provide an axial keyed recess for receiving a valve actuator 188. Disposed on the inner surface of closure member 170 and embedded therein are the contact 48 and the extended contact 50 as seen in FIG. 7. Thus closure member 170, contact 48, extended contact 50 and grounding ring 52 form a stationary contact assembly. The contacts 48 and 50 are disposed circumferentially on a common circumference and the grounding ring 52 is embedded on the same face of the closure member 170, but spaced radially outward therefrom and in contact with the body member 168. Thus the movable contactor assembly 182 and the inner surface of the closure member 170 are disposed adjacent each other with the contact 46 on the movable contact assembly 172 and the contacts 48, 50 and grounding ring 52 on the stationary contact assembly in face to face relationship. A central annular flange 190 on closure member 170 forms a bearing and guiding surface and is received in a central recess 192 of movable contactor plate 184. An annular radially extending flange 194 is provided on the shaft 180 and engages a shoulder 196 on the body portion 168 of the manual control. The flange 196 includes a detent protrusion 198 which engages detent recesses for positioning the manual control with contact 46 in engagement with contact 48 in the continuous run position and for positioning manual control in the parked position as seen in FIG. 7. A spring 200 is provided for biasing the flange 194 against the shoulder 196 to provide proper detent action and for biasing the movable contactor plate 184 against the inner surface of the closure 170 to provide good contact between the movable contactor 46 and the contactor 48 or 50. The flange 194 and a shoulder on the hub of the movable contactor assembly 182 form spring retainers at opposite ends of the spring 200.

The valve actuator 188 of the manual control assembly 166 includes an enlarged head portion 202 axially slidable within the hub portion 172 of closure 170 and a reduced portion 204 having a cross section complementary with the cross section of the recess 186 and receivable therein for rotation with the shaft 180. The valve actuator 188 is freely slidable axially within the recess 186. A shoulder 206 is formed at the junction of enlarged head portion 202 and reduced portion 204 of valve actuator 188. The shoulder 206 has a suitably cammed surface for engagement with a cooperating annular cam surface on the interior of hub 172 of valve actuator 188 upon rotation thereof in response to rotation of shaft 180. Threadably disposed within the free end of hub 172 is a valve body 208 having nipple 164 at the outer end thereof communicating with a valve conduit 210 having a valve seat at its inner end thereof. A tapered valve 212 is provided for regulating the flow through conduit 210. A vent opening 214 is provided in communication with the valve chamber 213 for permitting air to bleed from the conduit 160 through nipple 164 and conduit 210 when the valve 212 is open. Rotation of the shaft 180 results in rotation of valve actuator 188 and consequently resulting in axial movement of valve actuator 188 through engagement of cam surfaces on shoulder 206 and hub 172. Axial movement of valve actuator 188 causes axial movement of tapered valve 212. A spring 216 is provided in valve chamber 213 to bias the valve 212 toward an open position and to bias the shoulder 206 of valve actuator 188 against its associated cam surface. A knob 218 is provided on the free end of shaft 180 which projects from the control body 168 and is maintained in position by a set screw 220.

The control body 168 is formed to be received through an opening in a body portion, preferably the dash panel 220, and is retained in position thereon by an escutcheon nut 222 which is threadably received on a threaded reduced portion of the body 168 which projects through the dash panel 220. When the control knob 218 is rotated to rotate the shaft 180 of the manual control, the movable contactor assembly is first moved from a first detent position, as shown in FIG. 7, to a position where the movable contact 46 engages the contact 48. This movement results in no axial movement of the valve actuator 188, thus leaving the valve 213 wide open. When the knob 218 is rotated further, the manual contact 46 engages the contact 50 and from this point the engaging cam surfaces on the valve actuator 188 and the hub of the closure element 170 cause axial movement of the valve actuator 188 which in turn effects axial movement of the valve 212 toward closed position. Rotation of the knob 218 to its clockwisemost position results in an extremely restricted opening of conduit 210.

The manual control shown in FIG. 3 also includes additional structure for an additional function. Conduits 220 and 222 are provided which communicate with the interior of body member 168 and shaft 180 is provided with a reduced neck portion 224. An O ring type seal 226, 228 is provided at each end, respectively, of the reduced neck portion 224 of shaft 180 and is retained in position by ring retainers 230 and 232, respectively. In the normal position, the shaft 180 closes the conduit 222 and the conduit 220 communicates with the space surrounding the reduced neck portion 224 of the shaft 180. When the rod 180 is depressed against spring 200, conduits 220 and 222 can communicate with each other through the space surrounding reduced neck portion 224. If one of the conduits 220 and 222 is connected to a source of vacuum or other fluid pressure source and the other of the conduits 220 and 222 is connected to a fluid actuated control for an accessory, then by depressing the knob 218 the accessory may be actuated. This could be, for example, a windshield washer whereby depression of the knob 218 would initiate washer action through conduits 220 and 222 while rotation of the knob would control wiper action as described herein.

A fluid responsive valve assembly 156 is provided for automatically causing continuous wiper operation during vehicle acceleration regardless of the setting of the manual control. This may be an atmospheric vent control assembly responsive to manifold differential pressure. It will of course be understood that in accordance with the broadest aspects of this invention, the valve assembly 156 may be omitted if automatic shifting to continuous wiper operation during acceleration is not desired. In this case, conduits 154 and 160 would be formed of a single continuous conduit. It should also be understood that the valve 156 may be a separate element as shown or may be formed in combination with the cyclic timer housing 124, if desired. The fluid actuator valve 156 comprises a housing 234 formed of a segment 234a and a segment 234b crimped and pressed together about its periphery with a diaphragm 235 having its periphery pressed therebetween. The housing includes a first chamber 236 and a second chamber 238 having a compartment 238a and a compartment 238b. Compartment 236 communicates directly with conduit 154 through nipple 161 and with conduit 160 through nipple 162 so that flow of air through conduit 154, chamber 236 and conduit 160 is controlled by valve 212. Chamber 236 communicates with compartment 238a of chamber 238 through a poppet valve 240 on a valve seat 241 and is maintained closed by a spring 244. Compartment 238a has an opening 242 which communicates with the atmosphere and compartment 238b is connected to a source of fluid pressure as, for example, a vacuum source such as a manifold through a conduit 246 connected to a nipple 248 on housing segment 234b. A plunger 250 is secured to diaphragm 235 and is slidable in the passage 243 between chamber 236 and compartment 238a. A spring 252 is provided which biases the diaphragm and the plunger 250 in a valve unseating direction. However, the vacuum applied through nipple 248 maintains the plunger out of engagement with valve 240. Thus it can be seen that during vehicle acceleration when the manifold vacuum drops, the diaphragm 235 and plunger 250 will be driven upward to unseat valve 240, thus resulting in fluid flow from conduit 154 through passage 243 and atmospheric opening 242. Thus, during acceleration even though valve 212 restricts the opening of conduit 210 into chamber 213, the conduit 154 communicates with the atmosphere through opening 242 and compartment 238a of the valve assembly 156.

The operation of the windshield wiping system should now be apparent. The motor 14 is operated to cause output gear 82 to rotate in a counterclockwise direction, as viewed in FIG. 3. When the output gear 82 rotates, cam 86 engages protrusion 108 of bellcrank lever 96, causing clockwise rotation of the bellcrank lever from the solid line position seen in FIG. 3 to the broken line position, thus driving plunger 120 and diaphragm 130 to the left against the bias of spring 140. In so doing, air is evacuated from chamber 126 of the cyclic timing device 122 through conduit 142 and check valve 144 and is applied in part to the chamber 128. During normal operation when valve 240 of acceleration valve assembly 156 is closed, the rate of return of the diaphragm 130 and plunger 120 from spring pressure of spring 140 will depend upon the position of valve 212. When it is fully opened, the return of plunger 120 will be rapid. As valve 212 is closed and restriction of conduit 210 becomes greater, the plunger 120 will return more slowly. When the plunger 120 returns to the position shown in FIG. 3, the bellcrank lever 96 will be rotated counterclockwise, engaging contact 102 to actuate switch 34 to closed position thus resulting in wiper cycling as can be seen from the circuit diagram (FIG. 7) and the explanation thereof. When the bellcrank lever is in the broken line position and the plunger is moved to its extreme left, as seen in FIG. 3, contact 102 is released thereby maintaining the switch 34 in open position, resulting in a dwell period. However, wiper cycling will continue until cam 88 engages cam follower 110 to open parking switch 36. This occurs when the wipers are in the proper parked position. When the valve 212 is wide open, return of plunger 120 to the position where it effects closing of switch 34 occurs rather rapidly, resulting in a very short dwell period. When the valve 212 is moved to the right as seen in FIG. 3 to severely restrict the opening of conduit 210, the plunger 120 returns to its right hand position rather slowly and results in a long dwell period. Thus it can be seen that rotation of knob 218 and consequent movement of valve 212 regulates the duration of the dwell period. If, however, the vehicle is accelerated resulting in the opening of valve 240, air will be evacuated from chamber 128 through conduits 140 and 154, nipple 161, chamber 236, passage 243 and opening 242 rapidly so that no dwell period will occur since the switch 34 will be reclosed before the parking switch 36 is opened. Thus there will always be a complete circuit from the battery 32, lead 54 through the motor 14 to ground either through switch 36 or through switch 34, lead 68, terminal 50', contact 50, movable contact 46 and grounding ring 52 and lead 58 to ground.

Another embodiment of the invention is illustrated in FIG. 2 wherein a power unit which is described in detail in the aforesaid application Serial No. 292,201 is utilized. In this embodiment, switch 34', corresponding to switch 34 of the embodiment hereinabove described, is incorporated in a motor timer 122' and is external to the power unit. An internal parking switch 36' is disposed within the gear reducer housing 70' and is actuated by a lever 260 which in turn is actuated by a cam 262 on the output shaft 90' of the gear reducer 16'. The gear reduction unit 16' includes a housing 70' having a motor shaft 74' extending therein. The end of motor shaft 74' within the housing has thereon a worm 76' which engages a worm gear 78' having a pinion 80' mounted thereon for rotation therewith. The pinion 80' in turn engages output gear 82' mounted on output shaft 90'. An axially extending projection or stud 264 on output gear 82' is disposed to engage plunger 120' of motor timer or cyclic timing device 122'. The cyclic timing device 122' is similar to the cyclic timing device 122 shown in FIG. 3 and includes a housing 124' comprising a housing half 124'a which may be formed integrally with the gear reducer housing 70' and the housing half 124'b, the housing halves being secured together at their peripheral flanges with a diaphragm 130' having its peripheral edges disposed between the flanges of the housing halves. The plunger 120' is a multi-element plunger which is mounted for movement with the diaphragm 130' and operates the switch 34'. The motor 14 is rotatable in a direction effective to move the output gear 82' in a counterclockwise direction and when the stud 90' engages the plunger 120' it causes the diaphragm 130' to move against the bias of spring 140' and evacuates the chamber 126' through check valve 144'. A conduit 154' communicates with chamber 126' and air is bled into chamber 126' to equalize the pressure on opposite sides of the diaphragm 130' from the manual control as shown in FIG. 3 through suitable conduits. As in the FIG. 3 modification, a fluid valve actuated valve 156 may be inserted in the conduits leading from the manual control valve to the cyclic timing device.

The operation of the embodiment shown in FIG. 2 is similar to the operation of the FIG. 3 embodiment. The manual control valve is utilized in combination with the cyclic timing device 122' which actuates the switch 34' in response to rotation of the power unit output gear 82'. Movement of the plunger 120' to the right, as seen in FIG. 2, results in opening of the switch 34', thereby effecting a dwell period. When the plunger returns to the position at the left, as seen in FIG. 2, the switch 34' is reclosed. Thus the duration of the dwell period is measured by the time interval required for the plunger 120' to move inwardly toward the gear reduction housing and this time interval is regulated by rotation of the manual control knob 218 when the switch is in the intermittent dwell position.

It should now be apparent that an improved wiper system has been provided for producing either continuous wiper cycling or intermittent dwell wiper operation in which the dwell period can be varied and in which the wiper system can be switched from continuous to intermittent dwell operation utilizing a single control knob. It should also be apparent that the single manually operated control is capable of actuating auxiliary accessory equipment such as a windshield washer. Certain specific embodiments of the invention have been described for the purpose of illustration, but it will be apparent that various modifications and other embodiments are possible within the scope of the invention. For example, the manual control knob may utilize a push pull type of switching arrangement with an elongated intermittent dwell position rather than the rotary type of switch. It is to be understood, therefore, that the invention is not limited to the specific arrangement shown, but in its broadest aspects it includes all equivalent embodiments and modifications which come within the scope of the invention.

What is claimed is:

1. In a windshield wiper system for selectively producing intermittent dwell wiper opertaion for use on motor vehicles comprising a power unit including a motor and transmission for transferring the output of said motor to a windshield wiper; the combination comprising a torque transmitting mechanism adapted to be driven by the output shaft of said motor, cyclic timing means actuated by said torque transmitting mechanism, said cyclic timing means including time delay means for controlling the duration of the period of said cyclic timing means, circuit interrupting means responsive to said cyclic timing means for controlling energization of said power unit to provide intermittent dwell operation and a manually operable control including a park position and an intermittent dwell position having a single reversible mode of movement for selectively parking the wiper, effecting intermittent dwell operation and varying the dwell period of intermittent dwell operation.

2. In a windshield wiper system for selectively producing intermittent dwell wiper operation for use on motor vehicles comprising a power unit including a motor and transmission for transferring the output of said motor to a windshield wiper; the combination comprising a torque transmitting mechanism adapted to be driven by the output shaft of said motor, cyclic timing means actuated by said torque transmitting mechanism, said cyclic timing means including time delay means for controlling the duration of the period of said cyclic timing means, circuit interrupting means responsive to said cyclic timing means for controlling energization of said power unit to provide intermittent dwell operation and a manually operable control including a park position and an intermittent dwell position having a single reversible mode of movement for selectively parking the wiper, effecting intermittent dwell operation and varying the dwell period of intermittent dwell operation and means responsive to vehicle acceleration for automatically effecting continuous wiper operation during vehicle acceleration.

3. In a windshield wiper system for producing intermittent dwell wiper operation for use on motor vehicles comprising a power unit including a motor and transmission for transferring the output of said motor to a windshield wiper; the combination comprising a torque transmitting mechanism adapted to be driven by the output shaft of said motor, cyclic timing means actuated by said torque transmitting mechanism, said cyclic timing means including time delay means for controlling the duration of the period of said cyclic timing means, circuit interrupting means responsive to said cyclic timing means for controlling energization of said power unit to provide intermittent dwell operation and a manually operable control including a park position and an intermittent dwell position having a single reversible mode of movement for selectively parking the wiper, effecting intermittent dwell operation and varying the dwell period of intermittent dwell operation and a second reversible mode of movement for controlling a source of energy for powering auxiliary equipment.

4. In a windshield wiper system for producing intermittent dwell wiper operation for use on motor vehicles comprising a power unit including a motor and transmission for transferring the output of said motor to a windshield wiper; the combination comprising a torque transmitting mechanism adapted to be driven by the output shaft of said motor, cyclic timing means actuated by said torque transmitting mechanism, said cyclic timing means including time delay means for controlling the duration of the period of said cyclic timing means, circuit interrupting means responsive to said cyclic timing means for controlling energization of said power unit to provide intermittent dwell operation and a manually operable control including a park position and an intermittent dwell position having a single reversible mode of movement for selectively parking the wiper, effecting intermittent dwell operation and varying the dwell period of intermittent dwell operation and a second reversible mode of movement for controlling a source of energy for powering auxiliary equipment and means responsive to vehicle acceleration for automatically effecting continuous wiper operation during vehicle acceleration.

5. In a windshield wiper system for producing a dwell period following cyclic wiper operation to selectively effect intermittent dwell wiper operation comprising a motor and transmission means for transferring the output of said motor to a windshield wiper blade; the combination comprising a torque transmitting mechanism adapted to be driven by the output shaft of said motor, fluid flow regulated cyclic timing means actuated by said torque transmitting mechanism for providing intermittent wiper operation and manually actuatable control means for activating said cyclic timing means and for controlling the rate of fluid flow in said cyclic timing means to provide operator controlled variation of the dwell period during intermittent dwell wiper operation, said manually actuatable control means comprising a switching mechanism movable to a parked position, a continuous run position and an extended intermittent dwell position and including flow control means for controlling the rate of fluid flow in said cyclic timing means, said flow control means being variable in response to movement of said switching mechanism when in said extended intermittent dwell position.

6. In a windshield wiper system for selectively producing continuous wiper operation or intermittent dwell wiper operation wherein a dwell period follows wiper cycling comprising a motor and transmission means for transferring the output of said motor to a windshield wiper blade; the combination comprising a torque transmitting mechanism adapted to be driven by the output shaft of said motor, cyclic timing means actuated by said torque transmitting mechanism for producing a dwell period between cycles of wiper operation, said cyclic timing means including time delay means for controlling the duration of the dwell period and manually actuatable control means comprising a switching mechanism including a parked position for effecting parking of the wiper blades, a continuous run position for effecting continuous oscillation of the wiper blades and an extended intermittent dwell position for activating said cyclic timing means to produce a dwell period between cycles of wiper operation, said time delay means being variable in response to movement of said switching mechanism when in said extended intermittent dwell position whereby a single reversible mode of movement of an operator controlled switch will selectively produce parking of the wiper blades, continuous oscillation of the wiper blades, intermittent cycling of the wiper blades and variation in dwell periods of intermittent cycling of the wiper blades.

7. In a windshield wiper system for selectively producing continuous wiper operation or intermittent dwell wiper operation wherein a dwell period follows wiper cycling comprising a motor and transmission means for transferring the output of said motor to a windshield wiper blade; the combination comprising a torque transmitting mechanism adapted to be driven by the output shaft of said motor, cyclic timing means actuated by said torque transmitting means including pneumatic time delay means for controlling the period of said cyclic timing means, circuit interrupting means responsive to said cyclic timing means for controlling energization of said motor to provide intermitent dwell operation and a manually operable control including a park position, a continuous run position and an extended intermittent dwell position, said manually operable control including variable rate venting means for venting said pneumatic time delay means at an operator controlled rate to regulate the period of said cyclic timing means and single stem means for switching selectively from park position to continuous run position to intermittent dwell position and for varying the rate of said venting means in the intermittent dwell position.

8. In a windshield wiper system for selectively producing continuous wiper operation or intermittent dwell wiper operation wherein a dwell period follows wiper cycling comprising a motor and transmission means for transferring the output of said motor to a windshield wiper blade; the combination comprising a torque transmitting mechanism adapted to be driven by the output shaft of said motor, cyclic timing means actuated by said torque transmitting means including pneumatic time delay means for controlling the period of said cyclic timing means, circuit interrupting means responsive to said cyclic timing means for controlling energization of said motor to provide intermittent dwell operation and a manually operable control including a park position, a continuous run position and an extended intermittent dwell position, said manually operable control including variable rate venting means for venting said pneumatic time delay means at an operator controlled rate to regulate the period of said cyclic timing means and single stem means for switching selectively from park position to continuous run position to intermittent dwell position and for varying the rate of said venting means in the intermittent dwell position, said single stem means including manually actuated valve means for controlling a source of energy for auxiliary equipment.

9. In a windshield wiper system for selectively producing intermittent dwell wiper operation for use on motor vehicles comprising a power unit including a motor and transmission for transferring the output of said motor to a windshield wiper; the combination comprising a torque transmitting mechanism adapted to be driven by the output shaft of said motor, a cyclic timing mechanism actuated by said torque transmitting mechanism, said cyclic timing mechanism including a resiliently biased plunger and pneumatic time delay means acting in opposition to said resilient bias for controlling the period of said cyclic timing mechanism, circuit interrupting means for controlling energization of said motor to provide intermittent dwell operation, parking switch means paralleling said circuit interrupting means for deenergizing said motor in the proper parking position, and manually operated switch means for bypassing said parking switch and said circuit interrupting means to provide continuous wiper operation, first and second cam means disposed on a rotating element of said torque transmitting mechanism for actuating a lever and said parking switch, respectively, said lever being disposed adjacent said cam means having respective portions engageable with said spring biased plunger and said circuit interrupting means, said lever being effective to hold said circuit interrupting means closed in response to a force applied by said spring biased plunger; and to release said circuit interrupting means to open circuit condition and to apply a force to said plunger against said spring bias to cause activation of said pneumatic time delay means in response to a force applied by said first cam means whereby said plunger remains disengaged from said lever for a predetermined duration of time resulting in a dwell period.

10. In a windshield wiper system for selectively producing intermittent dwell wiper operation for use on motor vehicles comprising a power unit including a motor and transmission for transferring the output of said motor to a windshield wiper; the combination comprising a torque transmitting mechanism adapted to be driven by the output shaft of said motor, a cyclic timing mechanism actuated by said torque transmitting mechanism, said cyclic timing mechanism including a resiliently biased plunger and pneumatic time delay means acting in opposition to said resilient bias for controlling the period of said cyclic timing mechanism, circuit interrupting means for controlling energization of said motor to provide intermittent dwell operation, parking switch means paralleling said circuit interrupting means for deenergizing said motor in the proper parking position, and manually operated switch means for bypassing said parking switch and said circuit interrupting means to provide continuous wiper operation, first and second cam means disposed on a rotating element of said torque transmitting mechanism for actuating a lever and said parking switch, respectively, said lever being disposed adjacent said cam means having respective portions engageable with said spring biased plunger and said circuit interrupting means, said lever being effective to hold said circuit interrupting means closed in response to a force applied by said spring biased plunger; and to release said circuit interrupting means to open circuit condition and to apply force to said plunger against said spring bias to cause activation of said pneumatic time delay means in response to a force applied by said first cam means whereby said plunger remains disengaged from said lever for a predetermined duration of time resulting in a dwell period and manual control means including said manual switch means in a first position and a second extended intermittent dwell position wherein said circuit interrupting means is effectively connected in circuit with said motor and variable venting means for controlling the period of said time delay means, said venting means being variable in response to manual movement in said intermittent dwell position.

References Cited by the Examiner
UNITED STATES PATENTS 3,110,056   11/63   Oishei et al. _____ 12—250.12
3,117,335   1/64   Oishei et al. _____ 15—250.12

CHARLES A. WILLMUTH, *Primary Examiner.*